US005679428A

United States Patent [19]

Sawada et al.

[11] Patent Number: 5,679,428

[45] Date of Patent: Oct. 21, 1997

[54] BINDING MACHINE USING A TAPE AND A BINDING TAPE

[75] Inventors: Sueji Sawada; Masayuki Kasuya, both of Tokyo, Japan

[73] Assignee: Picard Co., Tokyo, Japan

[21] Appl. No.: 526,061

[22] Filed: Sep. 8, 1995

Related U.S. Application Data

[62] Division of Ser. No. 311,188, Sep. 23, 1994.

[30] Foreign Application Priority Data

| | | | |
|---|---|---|---|
| Oct. 1, 1993 | [JP] | Japan | 5-267809 |
| Aug. 3, 1994 | [JP] | Japan | 6-182446 |

[51] Int. Cl.$^6$ .................. B32B 7/12

[52] U.S. Cl. .................. 428/42.2; 428/137; 428/189; 428/906

[58] Field of Search .................. 428/42, 137, 189, 428/43, 136, 42.2, 906

[56] References Cited

U.S. PATENT DOCUMENTS

| | | | |
|---|---|---|---|
| 3,501,365 | 3/1970 | Marshall | 428/42 |
| 4,335,172 | 6/1982 | Sato | 428/42 |
| 4,479,316 | 10/1984 | Wippern | 428/42 X |
| 4,572,855 | 2/1986 | Kalus | 428/42 X |
| 5,153,043 | 10/1992 | Wang | 428/42 |
| 5,262,216 | 11/1993 | Popat et al. | 428/42 |
| 5,413,384 | 5/1995 | Principe et al. | 428/42 X |

*Primary Examiner*—Daniel Zirker
*Attorney, Agent, or Firm*—Bauer & Schaffer

[57] ABSTRACT

The binding machine (1) using the tape employs the binding tape (6) having the bonding tape (7) coated on its rear surface with the adhesive and consists of the boring mechanism (2) for boring the aperture (h) through the papers (P) to be bound and the binding mechanism (3) which winds the bonding tape (7) around or halfway around the portion between the bored aperture (h) and the end surface ($p_1$) of the papers (P) and so on to be bound and bonds the bonding tape (7) thereto.

4 Claims, 11 Drawing Sheets

BINDING MACHINE USING A TAPE AND A BINDING TAPE

This is a divisional of Ser. No. 08/311,188, filed Sep. 23, 1994 still pending.

BACKGROUND OF THE INVENTION

1. Field of the Invention

The present invention relates to a machine for binding papers, a bag opening and so on and particularly to a binding machine using a tape, which bores an aperture through a bundle of papers and so on and binds the papers and so on with a tape by piercing the tape made of a paper, for example, through the aperture, and a binding tape.

2. Related Art

An existing binding machine is such that a Hotchkiss type stapling machine using a staple cartridge binds the papers by driving a metal staple into a bundle of the papers to an extent that needles of the staple are pierced therethrough and then projected from a rear surface of the papers and by bending finward the needles of the staple projected from the rear surface of the papers.

The binding machine using the staple (a stapling machine) according to this method is sometimes encountered by disadvantages such that the staple is stuck into a finger by mistake when the papers are bound and that the needles of the staple catch a cloth and injure a skin if they are not satisfactorily bent but projectingly kept. When the papers which are already bound are to be released because the papers are not satisfactorily bound or become unnecessary, an equipment such as a remover for removing the staple is necessary. Without such remover, it is attempted to remove the staple with a fingernail. However, there is then the risk such that the fingernail is injured and, moreover, clacks if the staple is thick.

When the unnecessary papers are fed into a paper cutting machine such as a shredder or the like, it is necessary to remove the staple from the bound papers. If the papers bound by the staple are fed into the paper cutting machine by mistake, there is then the disadvantage such that the staple is caught by the paper cutting machine, which causes trouble in operation thereof and further damages a blade portion of the paper cutting machine to lead to reduction of life of the cutting machine. An envelop is sometimes stapled and sealed by the stapling machine. When a letter opener is used to open such envelop, the stapled envelop sometimes causes trouble. Therefore, in consideration of inconvenience in opening the envelop, it is not recommended to staple the envelop to seal it.

On the other hand, when many bundles of the papers bounded by the metal staples are housed and piled, only an upper left stapled portion, for example, of a pile of the papers becomes extraordinarily thick because one bundle of papers becomes thick only at a stapled portion and hence the whole papers to be housed unnecessarily becomes thick. In practice, the metal staple is not used for the papers to be kept for a long period of time. This practice seems to result from a property of the metal staple which rusts comparatively early. It is often observed that no countermeasure can be taken after the metal staple binding the papers rusts. As described above, the metal staple cannot be used for the papers required to be kept for a long period of time, so that a paper string, a binding string and so on are practically used.

Further, when a bag which houses food and so on is bound by the staple, it is sometimes observed that the released staple falls into the food and so on and that the staple which is not intended to be released is released and falls into the food and so on, so that it is sometimes dangerous to staple the bag. Since both edges of the released staple are sharp, there is then the risk such that a finger, for example, is injured by the edges of the staple.

SUMMARY OF THE INVENTION

An object of the present invention is to provide a binding machine using a tape, which employs a system of binding papers and so on with a tape made of a material such as paper or the like and eliminates disadvantages of a conventional stapling machine, and a binding tape.

In order to achieve the above objects, the binding machine using the tape according to the present invention consists of a tape coated with an adhesive, a boring mechanism for boring an aperture by a cutter body through papers and so on to be bound, a binding mechanism using the tape which winds the tape around or halfway around a portion between the bored aperture and an end portion of the papers and so on to be bound and bonds the tape to the papers by pressing the papers by a paper pressing body.

The binding tape for use in the binding machine of the present invention is formed by bonding a bonding tape cut at a predetermined interval to an auxiliary tape to be capable of being peeled off from the latter.

BRIEF DESCRIPTION OF TEE DRAWINGS

Figure 8:
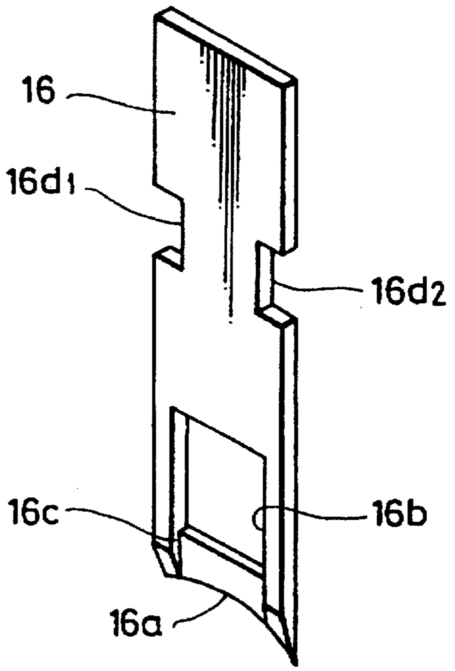
Figure 9:
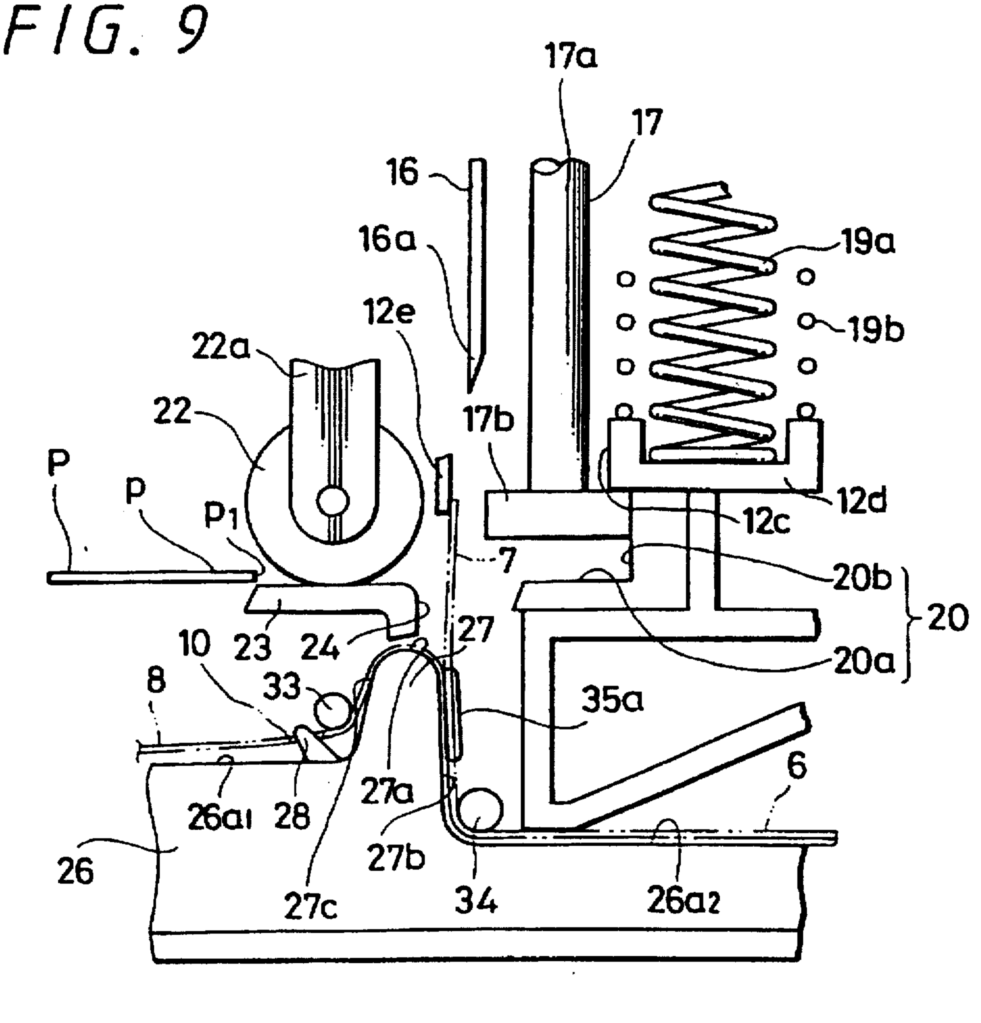
Figure 10:
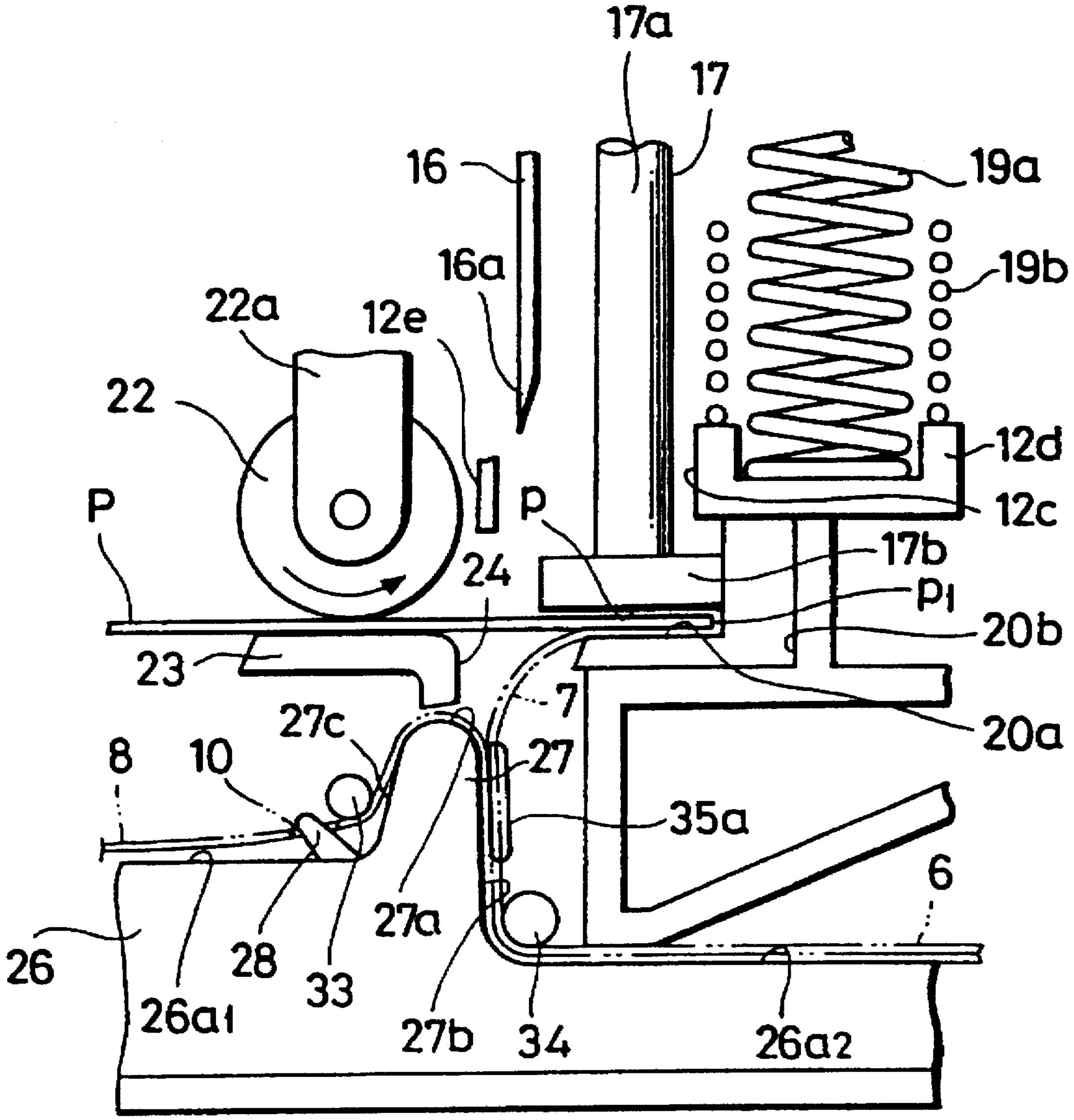
Figure 11:
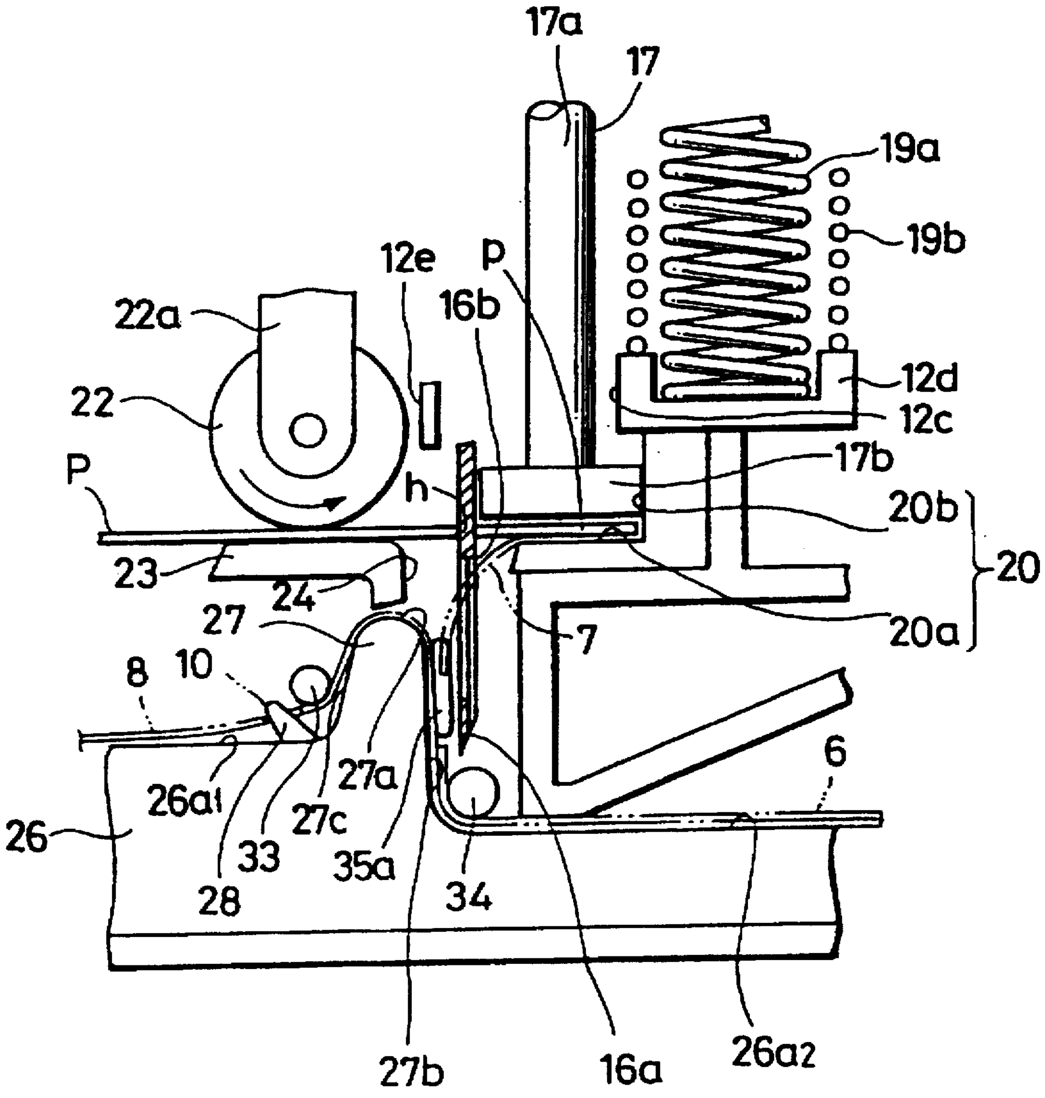
Figure 12:
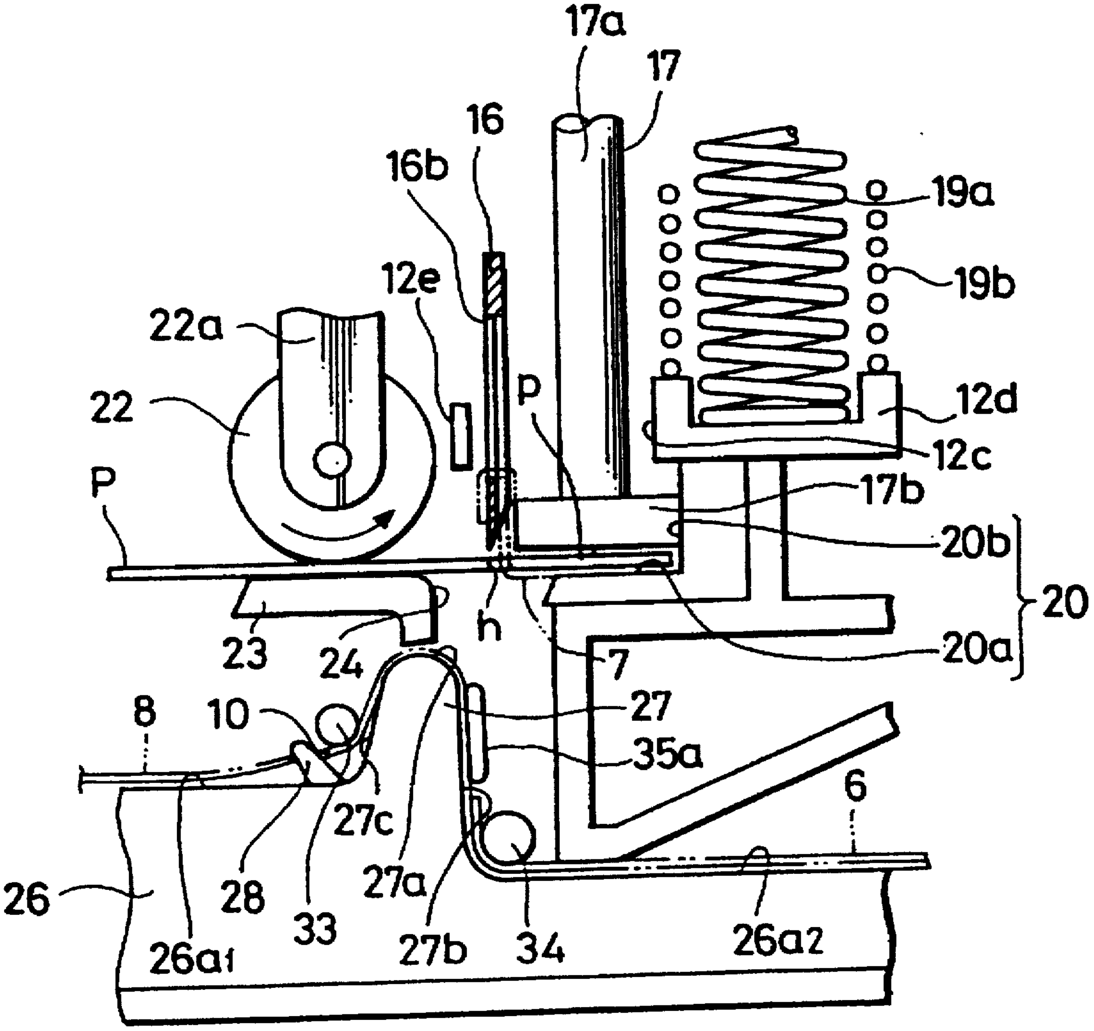
Figure 13:
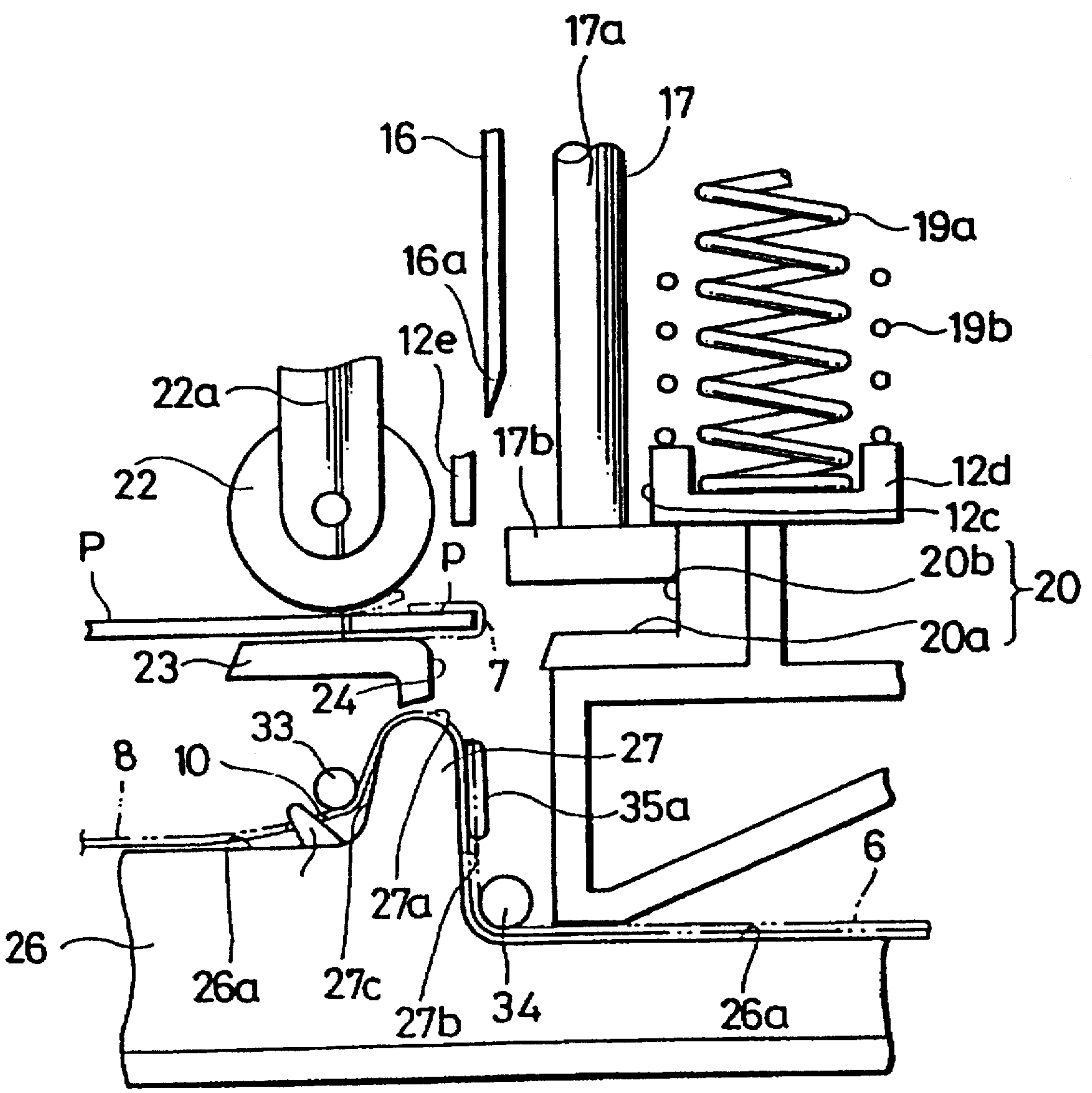

PIG. 7 is a side view of a portion for inserting and guiding papers and so on to be bound of the same binding machine;

FIG. 8 is a perspective view showing an example of a blade body for use in the same binding machine;

FIG. 9 is an enlarged diagram used to explain operation of the same binding machine (in an initial state);

FIG. 10 is an enlarged diagram used to explain the operation of the same binding machine (in a state in which the papers to be bound are gripped);

FIG. 11 is an enlarged diagram used to explain the operation of the same binding machine (in a state in which the blade body is inserted into the papers for cutting);

FIG. 12 is an enlarged diagram used to explain the operation of the same binding machine (in a state in which the blade body is returned); and FIG. 13 is an enlarged diagram used to explain the operation of the same binding machine (in a state in which the bonding tape is completely bonded on the papers).

DESCRIPTION OF THE PREFERRED EMBODIMENT

A binding machine using a tape and a binding tape used therein according to an embodiment of the present invention will hereinafter be explained with reference to the attached drawings.

Figure 1:
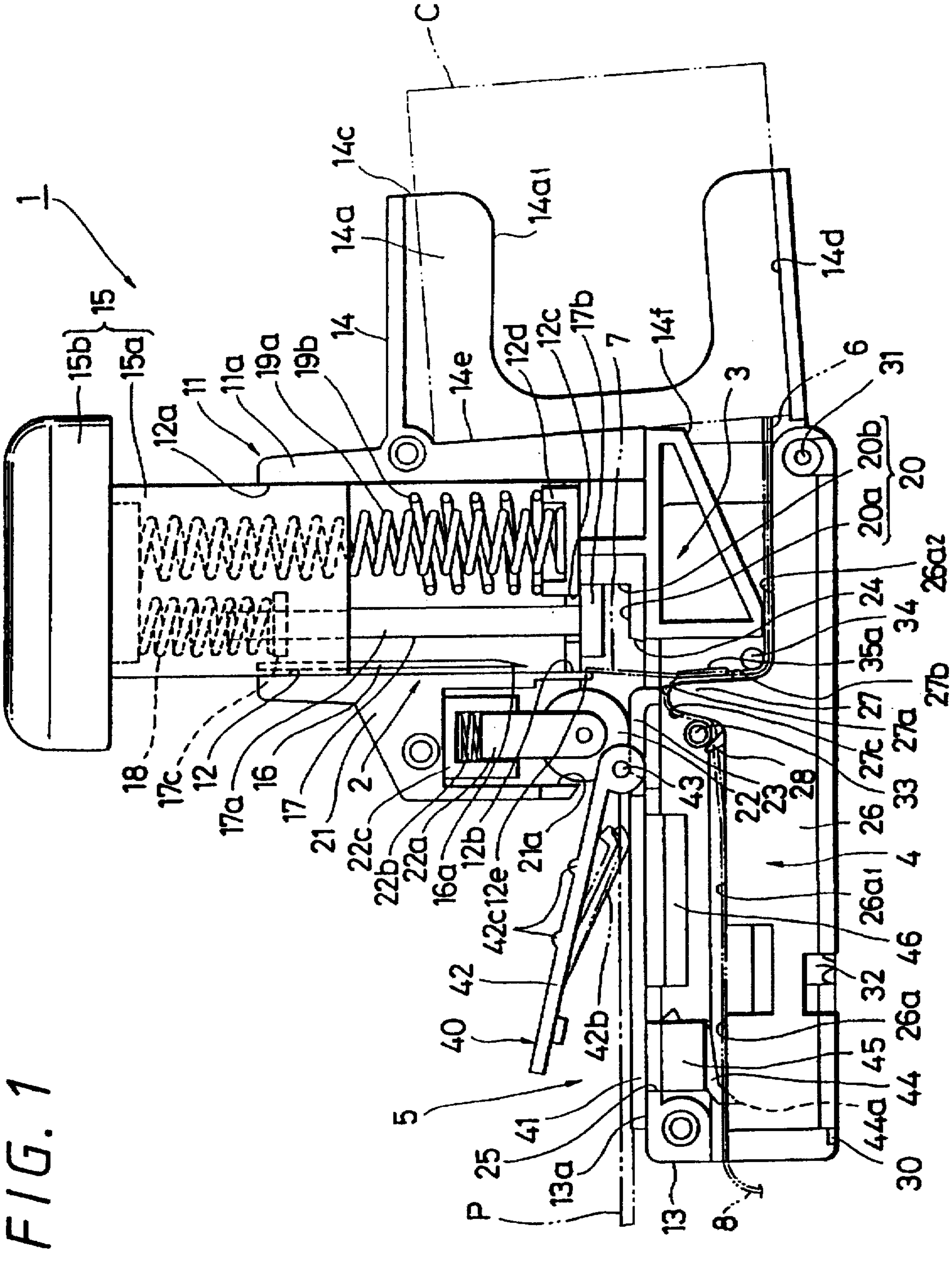
FIG. 1 is a partially omitted, side view showing a binding machine using a tape according to an embodiment of the present invention.

FIG. 1 is a side view showing the binding machine using the tape according to the embodiment of the present invention in which one side surface portion (a right side surface portion) thereof is removed. In FIG. 1, reference numeral 1 represents the whole of the binding machine using the tape, which consists of a boring mechanism 2 and a binding mechanism 3 including a binding-tape forwarding and guiding mechanism 4 and a mechanism 5 for moving papers and so on to be bound. The papers and so on are bound by the binding machine 1 into which a binding tape 6 is loaded.

Figure 2:
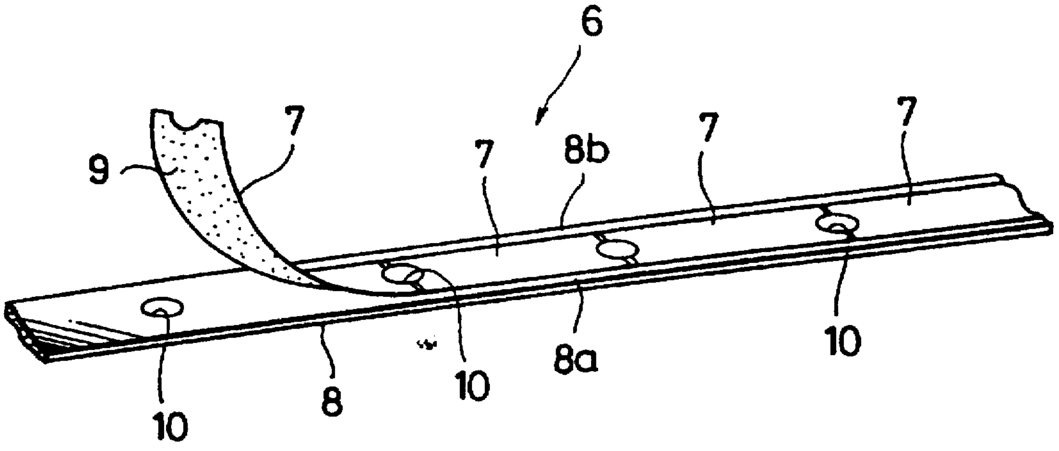
FIG. 2 is a perspective view showing a binding tape according to the embodiment of the present invention.

FIG. 2 is a perspective view showing a part of the binding tape according to the embodiment of the present invention. In FIG. 2, reference numeral 6 represents a binding tape which consists of a bonding tape 7 and an auxiliary tape 8 which is mounted with and holds the bonding tape 7 such that the bonding tape 7 can be peeled off therefrom.

The bonding tape 7 is coated on its rear surface with an adhesive 9 and cut at constant intervals. The unit length of the cut bonding tape 7 is determined on the basis of the thickness and binding width of the papers and so on to be bound.

Figure 3:
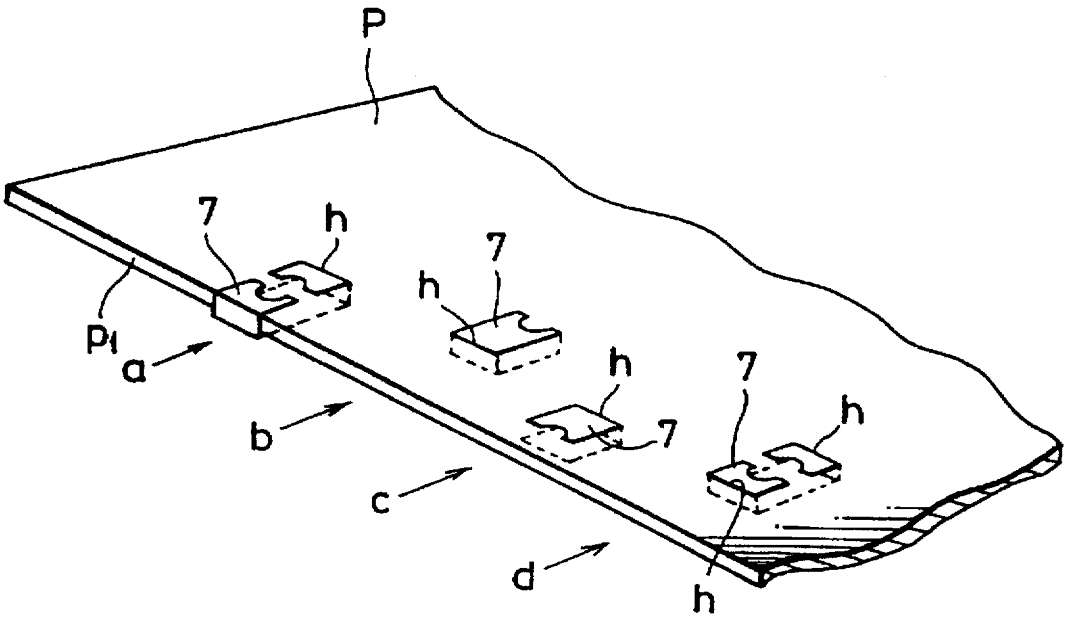
FIG. 3 is a perspective view showing the binding tape and various kinds of how to bind papers.

In other words, as shown in FIG. 3, the unit length of the bonding tape 7 is a length obtained by adding a length twice a width from an end surface $p_1$ of papers P to be bound to a slit-shaped aperture h bored through the papers P, which will be described later on, and a length twice a thickness of the papers P. This unit length is a length calculated on the basis of requirement of a length of the bonding tape 7 sufficient for substantially surrounding a portion between the end surface $p_1$ of the papers P and the slit-shaped aperture h. Even if the thickness of the papers P to be bound and/or the binding width are a little larger than those obtained from calculation, it leads to only that the bonding tape 7 becomes a little shorter than the length for surrounding the above portion. Therefore, even if the bonding tape is not completely bonded to the above portion, it does not prevent the papers P from being bound satisfactorily.

If there is taken a countermeasure for the above slight tape shortage in which the length of the bonding tape 7 is set a little longer than the predetermined length and a length from the end surface $p_1$ of the papers P to be bound to a position where the slit-shaped aperture h is bored is set a little shorter, the thickness of the papers P and so on to be bound can be given with a room to some extent.

As shown in FIG. 2, tape forwarding apertures 10 are bored at constant intervals through the binding tape 6 in which the bonding tapes 7 each having the predetermined length are successively bonded to and held by the auxiliary tape 8 so as to be peeled from the auxiliary tape 8. The tape forwarding apertures 10 are positioned between the adjacent bonding tapes 7 and bored through both of the bonding tape 7 and the auxiliary tape 8. The tape forwarding apertures 10 are used to forward the bonding tape 7 to be subsequently used into the binding mechanism 3 of the binding machine 1. As will be described later on, the tape forwarding aperture 10 is engaged with a forwarding projection provided at the moving mechanism 5 which forwards the binding tape 6 in a ganged relation with moving the moving mechanism 5 away from the boring mechanism 2, thereby peeling the bonding tape 7 from the auxiliary tape 8. Thus, the subsequent bonding tape 7 is prepared for the next binding operation.

On the other hand, the auxiliary tape 8 is made such that its width is set larger than the width of the bonding tape 7 and both of the side edge portions of the auxiliary tape 8 are used as press edge surface portions 8a, 8b where the bonding tape 7 is not bonded.

The bonding tape 7 of binding tape 6 described above is previously cut at predetermined intervals, while the bonding tape 7 can be arranged such that it is bonded to and held by the auxiliary tape 8 without being cut but able to be peeled from the auxiliary tape 8 and then only the bonding tape 7 is cut by a tape cutter at optional and random intervals before being inserted into the biding mechanism 3 of the binding machine 1. It can be considered that the bonding tape 7 is not mounted on and held by the auxiliary tape 8.

The tape forwarding apertures 10 provided through the binding tape 6 are not limited to those shown in FIG. 2. Instead of the aperture, the binding tape 6 can have notch portions, not shown, which are provided by cutting the side edge portion of the auxiliary tape 8 and engaged with the above projection or a similar projection to forward the binding tape 6. The bonding tape 7 or the auxiliary tape 8 can be gripped at both of its surfaces by roller-shaped members to forward it. According to the embodiment shown in FIG. 1, the binding tape 6 is housed in a housing case C in a state in which the binding tape 6 is rolled around a cylindrical core and the bonding tape 6 can be loaded into and unloaded from the housing case C. The tape roll can be freely exchanged.

In another embodiment, not shown, in which the tape forwarding aperture is not provided, a tape feeder (a tape feeding apparatus) can be provided separately.

The binding machine using the tape according to the embodiment of the present invention will subsequently be explained with reference to FIGS. 1 and 4 to 13.

In the above figures, reference numeral 1 represents the whole of the binding machine using the tape. A housing 11 of the binding machine 1 is formed by combining substantially symmetrical left and right half housings 11a, 11b which can be detachably assembled. A main mechanism housing portion 12 for housing a main mechanism consisting of the boring mechanism 2 and the binding mechanism 3 is formed substantially at a center portion of the housing 11 so as to have a shape of an erect cylinder with an opening on its upper surface side. There is formed at a front side of the main mechanism housing portion 12 a guide portion 13 for guiding the moving mechanism 5 which is movable in a horizontal direction with gripping the papers and so on to be bound. A housing portion 14 for housing the binding tape 6 is formed at a rear side of the main mechanism housing portion 12.

Figure 5:
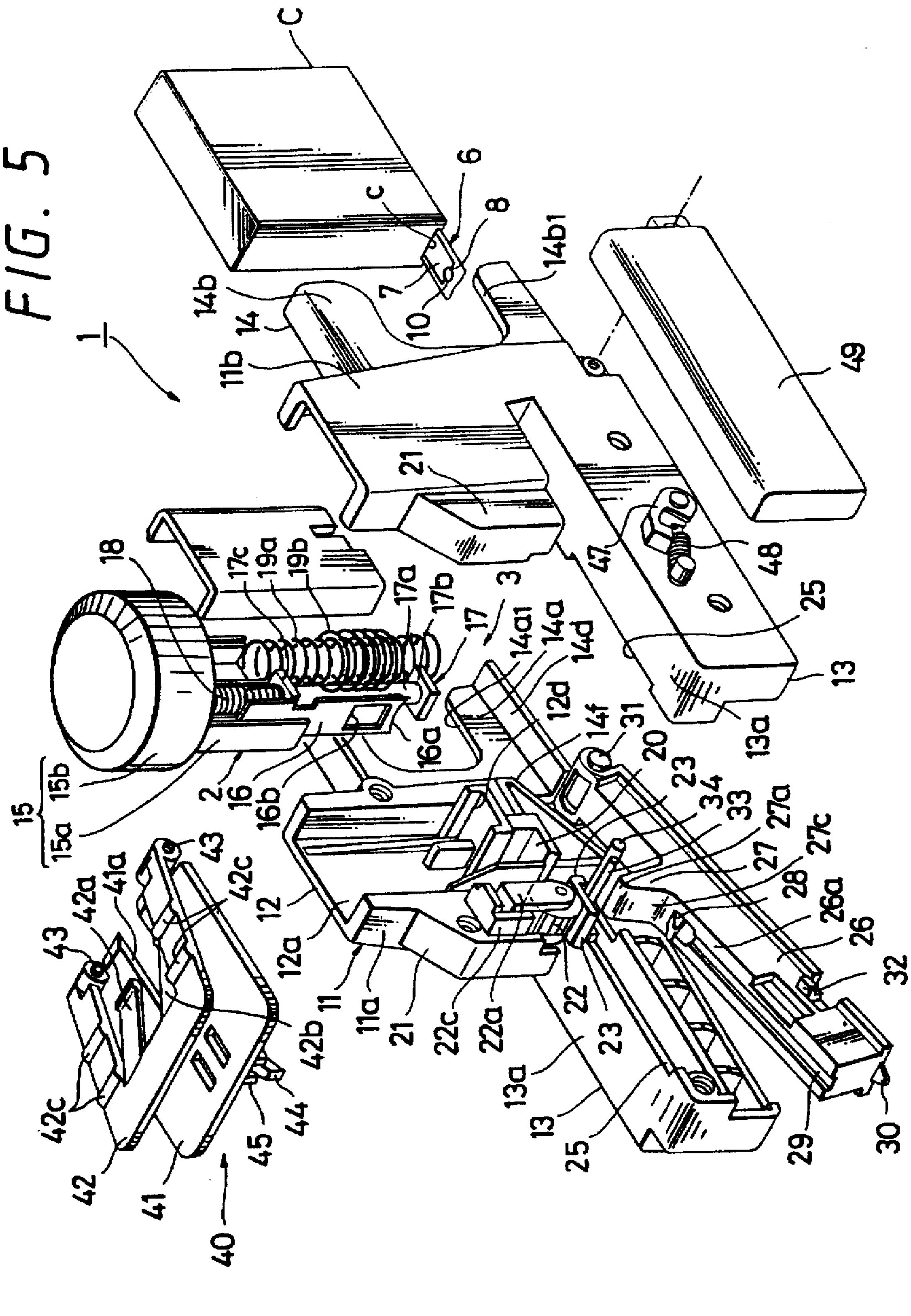
FIG. 5 is an exploded, perspective view of the binding machine shown in FIG. 4.

As shown in FIGS. 1 and 5, a pressing member 15 is inserted into the main mechanism housing portion 12 of the housing 11 from its upper opening portion 12a so as to be slid in upward and downward directions. The pressing member 15 is formed of a holding frame portion 15a inserted into the main mechanism housing portion 12 for holding movable portion of the main mechanism and a pressing handle 15b which is fixed on an upper end of the holding frame portion 15a and projected upward from the main mechanism housing portion 12.

The holding frame portion 15a of the pressing member 15 holds a blade body 16, which is a main member of the boring mechanism 2, for boring an aperture through the papers to be bound and a pressing body 17 which is a main member of the binding mechanism 3. The blade body 16 is formed as will described later on and held by the holding frame portion 15a so that its almost half portion on a blade edge 16a side should be projected downward relative to a lower end of the holding frame portion 15a and so as to be attached and detached. The pressing body 17 includes a shaft 17a, a pressing piece 17b horizontally fixed on a lower end of the shaft 17*a*, and a collar piece 17*c* fixed on the shaft 17*a* at a position displaced from its upper end by a predetermined length. The pressing body 17 is held by the holding frame portion 15*a* so as to be projected downward relative to the blade body 16 and to be slid in the upward and downward directions. A pressing spring member 18 formed of a compression coil spring, for example, is disposed between the upper end portion, i.e., the collar piece 17*c* fixed on the shaft 17*a* of the pressing body 17 and a lower surface of the pressing handle 15*b*. The pressing member 15 includes therein a first restoring spring member 19*a* and a second restoring spring member 19*b* which are formed of a compression coil spring, for example. The first restoring spring member 19*a* is fitted at its upper end portion to a lower surface side of the pressing handle 15*b* to thereby be held so as to be hung, and the second restoring spring member 19*b* is arranged such that a lower half portion of the first restoring spring member 19*a* is inserted into the second restoring spring member 19*b*.

As shown in FIG. 1, an insertion opening 12*b* into which the blade body 16 is inserted, a supporting hole 12*c* for supporting the shaft 17*a* of the pressing body 17 inserted thereinto and a dish-shaped bearing surface portion 12*d* for supporting lower ends of the first and second restoring spring member 19*a*, 19*b* are formed at a lower portion of the main mechanism housing portion 12 of the housing 11 into which the pressing member 15 is inserted. A contact piece portion 12*e* is formed at a front edge side of the insertion opening 12*b* so as to be projected downward.

At a rear end portion of a guide surface 13*a* of the guide portion 13 for guiding the papers and so on to be bound which is provided below the main mechanism housing portion 12, i.e., horizontally extended forward from a portion below the main mechanism housing portion 12, a positioning portion 20 for positioning a side of a bind portion of the papers and so on to be bound is provided so as to be located below the above-mentioned supporting aperture 12*c*. The positioning portion 20 is opposed to the above-mentioned pressing piece 17*b* of the pressing body 17 and consists of a mount surface 20*a* for mounting thereon the bind portion of the papers and so on and a projecting contact surface 20*b* along which a rear end edge of the pressing piece 17*b* is slid and with which the end surface of the bind portion is brought in contact, both of which allows the positioning portion 20 to have a cross section with its shape of a reversed L letter.

The shaft 17*a* of the pressing body 17 is inserted into the supporting aperture 12*c* by inserting the pressing member 15 into the main mechanism housing portion 12 and the first and second restoring spring members 19*a*, 19*b* are mounted on and brought at their lower surfaces in contact with the bearing surface portion 12*d*. Then, the pressing member 15 is slidably pushed upward by a restoring spring force of the first restoring spring member 19*a* and then positioned on an upper side of the main mechanism housing portion 12 with being considerably projected upward from the upper opening portion 12*a*. In this state, the blade body 16 is located above the insertion opening 12*b* so as to be opposed thereto at a predetermined interval. The pressing piece 17*b* of the pressing body 17 is located above the positioning portion 20 so that its lower surface should be opposed to the mount surface 20*a* at a predetermined interval and its rear end edge should be slidably in contact with the projecting contact surface 20*b*.

When the pressing body 15 is pressed at the pressing handle 15*b* and further pushed down into the main mechanism housing portion 12 against the restoring spring force of the first restoring spring member 19*a*, the pressing piece 17*b* of the pressing body 17 is brought in contact with the mount surface 20*a* of the positioning portion 20 and then presses the mount surface 20*a* because a spring force of the pressing spring member 18 is applied to the shaft 17*a*. When the pressing member 15 is further pushed downward, the pressing member 15 is moved downward with contracting the second restoring spring member 19*b* and the blade body 16 reaches the guide surface 13*a* of the guide portion 13 through the insertion opening 12*b* and then is brought below the guide surface 13*a* after being passed through the insertion opening 12*b*. At this time, the pressing piece 17*b* of the pressing body 17 is strongly pressed on the mount surface 20*a*.

When the pressing member 15 is released from being pressed from this state, the pressing member 15 is strongly slid and returned upward by the double restoring spring force obtained from the first and second restoring spring members 19*a*, 19*b* and the blade body 16 is passed through the guide surface 13*a* from a lower side thereof to an upper side thereof and then returned into the insertion opening 12*b*. In this state, the pressing piece 17*b* is kept being pressed on the mount surface 20*a* by the spring force of the pressing spring member 18, and the pressing member 15 is still comparatively slightly slid and returned by the restoring spring force of the first restoring spring force 19*a*. When this return of the pressing member 15 is completed, the pressing member 15 is stopped from being pressed on the mount surface 20*a* and then is moved upward.

A supporting portion 21 with an opening at its lower end is formed on a front surface side of the main mechanism housing portion 12. A rotating pressing body 22 formed of a roller made of a synthetic resin, for example, is inserted into the supporting portion 21 together with a supporting body 22*c* including a bearing 22*a* and a spring member 22*b* therein and held by the supporting portion 21 so as to be projected from a lower opening portion 21*a* thereof.

As shown in FIGS. 1 and 5, a press contact surface portion 23, which is located at the same level as the mount surface 20*a* of the positioning portion 20, is provided on the guide surface 13*a* of the guide portion 13 so as to be opposed to the rotating pressing body 22 springily projected from the lower opening portion 21*a* of the supporting portion 21. An opening 24 is formed between the press contact surface portion 23 and the positioning portion 20, being located below the above blade body 16 which is inserted thereinto. A long guide opening 25 extended in forward and backward directions is formed through the guide surface 13*a* of the guide portion 13 at its center portion to a front side from the press contact surface portion 23. The guide opening 25 is formed over both of the half housings 11*a*, 11*b*.

A tape housing portion 14 for housing the binding tape 6 is formed at a rear side of the main mechanism housing portion 12 and houses a tape case C housing the binding tape 6 wound around a roll. The tape housing portion 14 is opened and hollow at its rear side, where opening portions $14a_1$, $14b_1$ extended to a rear surface opening 14*c* are respectively formed at both side surface portions 14*a*, 14*b*. A lower surface portion 14*d* is formed so as to be inclined to become high in the backward direction, and a front surface 14*e* is formed perpendicularly to the inclined lower surface 14*d*. Since the tape housing portion 14 is thus formed, the tape housing case C can be inserted and ejected in a backward and slightly upward diagonal direction with being gripped at its both sides by fingers, so that the tape housing case C can be inserted and ejected smoothly.

The tape housing portion 14 is communicated to a lower portion of the guide portion 13 through an opening portion 14*f* formed through a lower portion of the front surface 14*e*.

A tape guiding body 26 is fitted to a lower portion of the guide portion 13 of the housing 11 so as to be rotated downward. The tape guiding body 26 is formed independently of the housing 11. The tape guiding body 26 is formed so as to be long block-shaped in forward and backward directions with being extended from a front end surface of the guide portion 13 to a front surface of the tape housing portion 14 and is engaged with the housing 11 at a lower surface side of the housing 11, i.e., between lower portions of both of the half housings 11a, 11b, thereby becoming integral with the housing 11. The tape guiding body 26 is formed as a tape guiding surface 26a at its upper surface side and formed at a portion corresponding to a front edge of the above-mentioned guide portion 13 side opening 24 as a ridge guiding portion 27 which has a top portion 27a formed as a curved surface and is sharply inclined at its rear surface 27b side. The tape guiding surface 26a of the tape guiding body 26 is formed at a front side of the ridge guiding portion 27 as a guide surface portion $26a_1$ located at a higher position and at a rear side thereof as a guide surface portion $26a_2$ located at a lower position. On the front side guide surface portion $26a_1$, a reversing feed blocking click 28 for being engaged with the tape forwarding aperture 10 of the auxiliary tape 8 of the binding tape 6 is projectingly provided adjacent to the ridge guide portion 27 and a guide groove 29 extended to the front end of the tape guiding body 26 from the reversing feed blocking click 28 is formed. There is projectingly provided at a lower portion of the front end surface a flat and substantially triangular cutting projection 30 for cutting the auxiliary tape 8.

The tape guiding body 26 is located between both of the half housings 11a, 11b and pivotally supported at its rear end portion by a shaft 31 fixed on a front side lower portion of the front surface opening portion 14f of the tape housing portion 14 so as to be rotated downward. The tape guiding body 26 is attached with an engaging stopper 32 so as to be engaged with and held by both the half housings 11a, 11b with being fitted into the housing 11.

Figure 6:
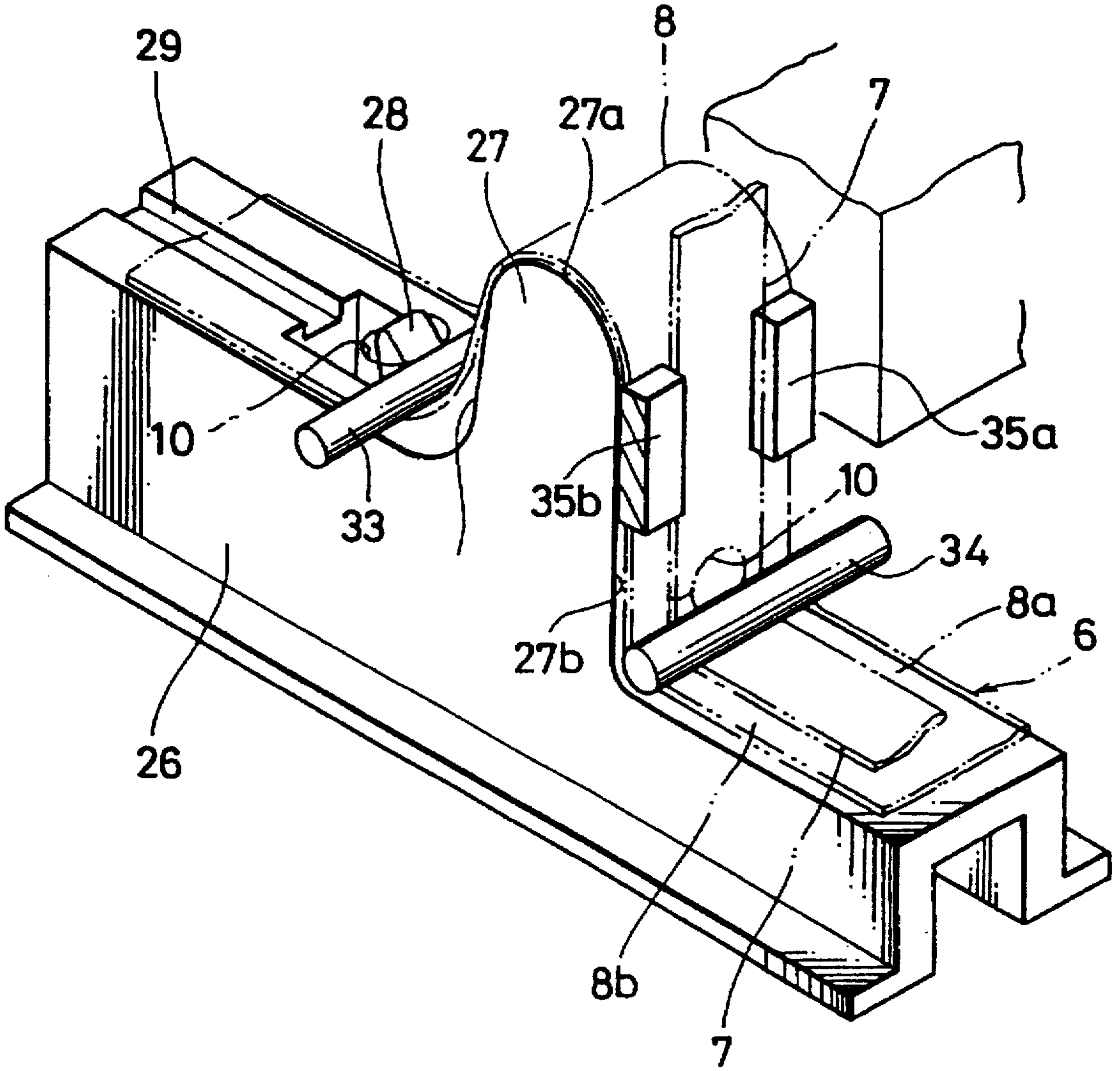
FIG. 6 is a perspective view of a binding-tape guiding portion of the same binding machine.

At a lower portion of the guide portion 13 of the housing 11 into which the tape guiding body 26 is fitted, a front side guide pin 33 positioned between the front surface 27a of the ridge guiding portion 27 of the tape guiding body 26 and the reversing feed blocking click 28 and a rear side guide pin 34 positioned so as to correspond to a bent portion between the rear surface 27b of the ridge guiding portion 27 and the rear side guide surface portion $26a_2$ are projectingly provided so as to bridge the tape guide surface 26a. As shown in FIG. 6, pressing pieces 35a, 35b corresponding to the press edge surface portions 8a, 8b provided at both sides of the auxiliary tape 8 are projectingly provided at an interval substantially equal to a thickness of the auxiliary tape 8 at a portion substantially corresponding to an upper half portion on the side of the rear surface 27b of the ridge guide portion 27. The ridge guide portion 27, the front and rear side guide pins 33, 34 and the pressing pieces 35a, 35b form a peeling unit for peeling the bonding tape 7 from the auxiliary tape 8.

On the guide surface 13a of the guide portion 13 of the housing 11, a movable gripping body 40 of the moving mechanism 5 for gripping the papers to be bound and for being moved toward the main mechanism housing portion 12, i.e., the boring mechanism 2 and the binding mechanism 3 is mounted so as to be slid in the forward and backward directions.

The movable gripping body 40 has two quadrangular gripping boards 41, 42 which are connected to each other at their one sides by a shaft pin 43 in a hinge fashion. A guide opening groove 41a having a width substantially equal to the width of the above-mentioned press contact portion 23 on the guide portion 13 is formed through the one (lower side) gripping board 41 from its end edge center portion on the hinge connection side to its substantial center portion of a board surface.

On the other hand, a pair of pressing springy pieces 42a, 42b located across the guide opening groove 41a of the one gripping board 41 are formed at the other (upper side) gripping board 42 so as to be bent upward in a direction from a free end side portion toward the connection side portion. Finger hooking projections 42c are formed on an upper surface of the other gripping board 42. In the other gripping board 42, the pressing springy pieces 42a, 42b may be formed of a part such as a plate spring or the like independent of the gripping board 42.

Figure 7:
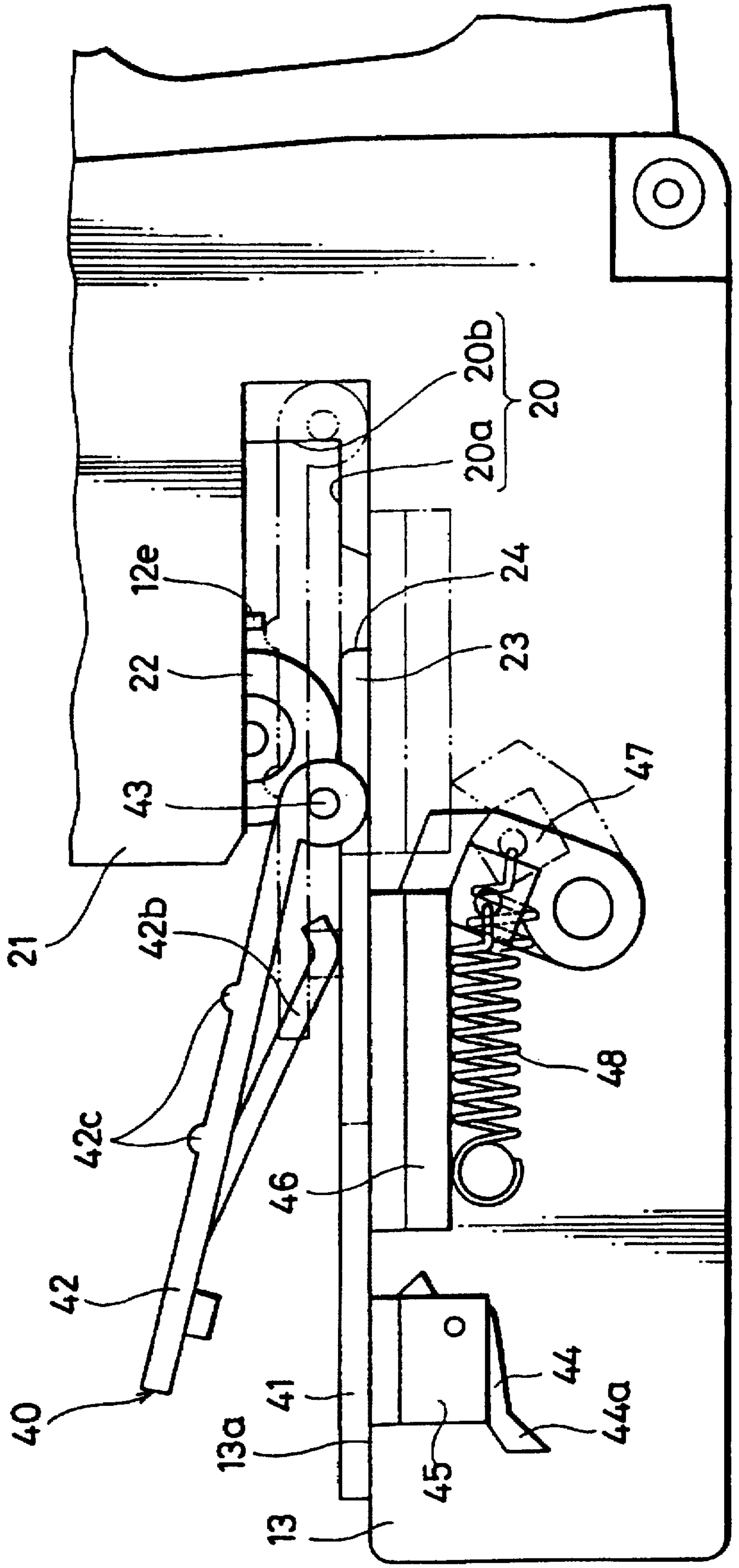

As shown in FIGS. 1 and 7, a forwarding click piece 44 for being engaged with the tape forwarding apertures 10 of the auxiliary tape 8 is supported by a supporting frame 45 at a substantial center portion of a lower surface of the one gripping board 41 so as to be rotated in the upward and downward directions and is rotatably biased by a biasing member, not shown, such as a spring or the like so that its tip end engaging portion 44a should constantly be projected downward. The forwarding click piece 44 is inserted into the guide opening 25 together with the supporting frame 45 to insert the tip end engaging portion 44a thereof into the guide groove 29 of the tape guiding body 26.

A long guide piece 46 extended in the forward and backward directions is projectingly provided at one side portion of the lower surface of the one gripping board 41 and is slidably in contact with one side surface of the housing 11, i.e., an outer surface of the right half housing 11b.

As shown in FIG. 7, a stopper cam 47 is pivotally fitted to a portion corresponding to the guide piece 46 on the outer side surface of the right side half housing 11b so as to be freely rotatable in the forward and backward directions. The stopper cam 47 is constantly rotatably biased by a springy biasing member 48 such as a coil spring or the like in the forward direction. The stopper cam 47 is slidably in contact with a lower surface of the guide piece 46 of the gripping board 41 with being rotated backward against a rotation biasing force. Since the stopper cam 47 can be brought in contact with a rear end surface of the guide piece 46, the stopper cam 47 is rotated forward and stops the guide piece 46 with being in contact with its rear end surface and the rotation biasing force permits the stopper cam 47 to press the guide piece 46 forward. In other words, when the guide piece 46 is slidably in contact with the stopper cam 47, the movable gripping body 40 can be freely moved in the forward and backward directions on the guide surface 13a of the guide portion 13. When the movable gripping body 40 is brought to the front end portion of the guide portion 13, the guide piece 46 is brought in contact with the stopper cam 47 at its rear end surface to stop the movable gripping body 40. When the movable griping body 40 is moved in the forward direction and then the guide piece 46 is about to leave the stopper cam 47, the stopper cam 47 is brought in contact with the rear end surface of the guide piece 46, which is pressed forward by the biasing force for forward rotation produced by the biasing member 48 of the stopper cam 47, so that the movable gripping body 40 is automatically returned to the front end of the guide portion 13 and then stopped.

When the movable gripping body 40 in the stopped state is moved backward, the movable gripping body 40 is pressed against the biasing force of the stopper cam 47 and then the guide piece 46 rotates the stopper cam 47 backward by pushing the stopper cam 47 backward and is brought slidably in contact with the stopper cam 47 with being located on the cam 47. Then, the movable gripping body 40 can be freely moved backward as described above.

Figure 4:
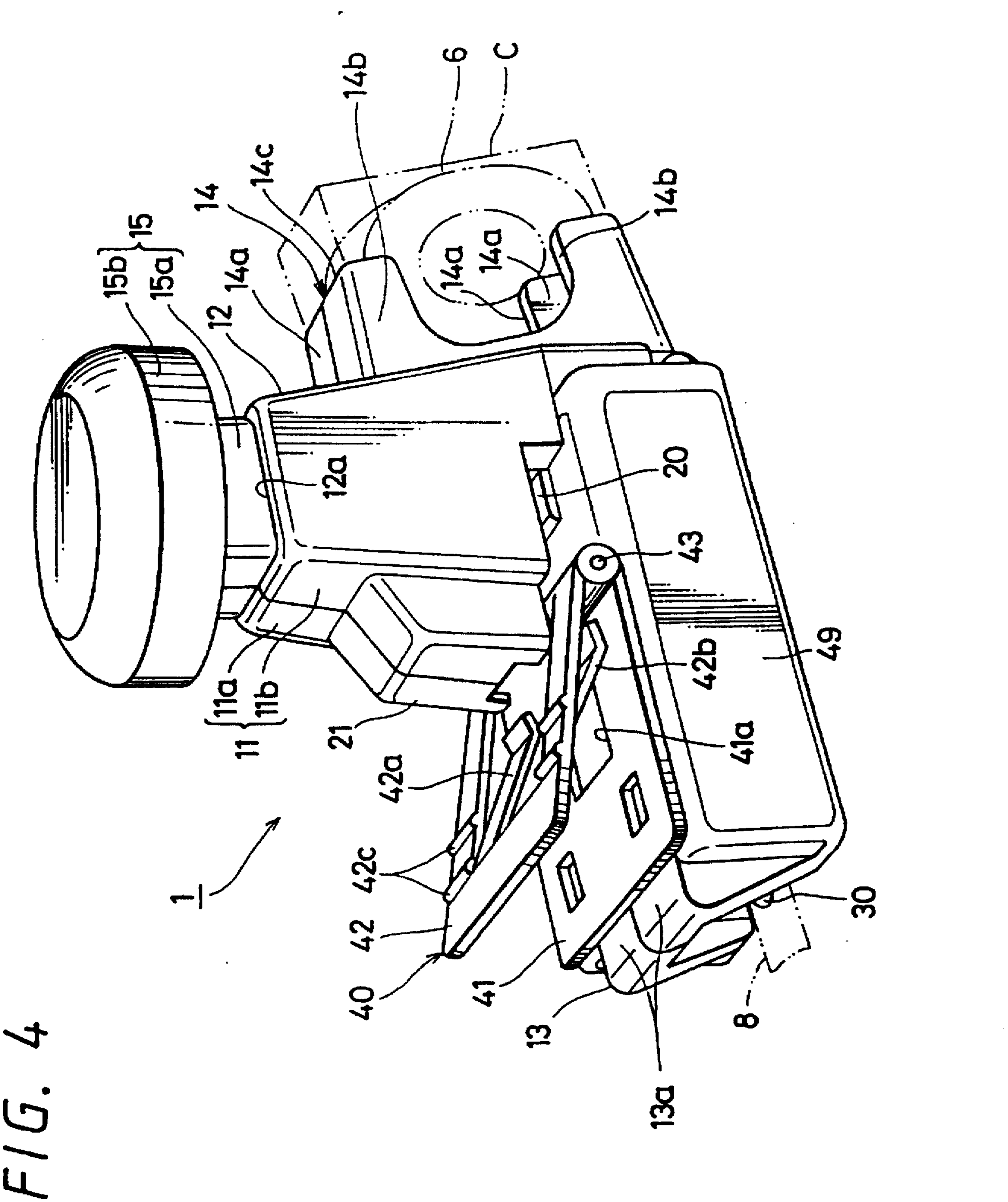
FIG. 4 is a perspective view showing the whole of the binding machine using the tape according to the embodiment of the present invention.

As shown in FIG. 4, a cover 49 for covering these members is fitted to the outer side surface of the right half housing 11*b* with which the guide piece 46 is slidably in contact and to which the stopper cam 47 is pivotally fitted.

The above-mentioned blade body 16 is formed as shown in FIG. 8 which shows an example thereof. The blade body 16 has a flat board having a wider width as compared with a predetermined width, i.e., the width of the bonding tape 7 of the binding tape 6, and is provided at its tip end with a blade edge 16*a* curved at its center. A tape insertion aperture 16*b* is bored through the blade body 16 adjacent to the blade edge 16*a* so as to have a little wider width as compared with the bonding tape 7. A tape guide groove 16*c* having the same width as that of the tape insertion aperture 16*b* is formed at a portion from the tape insertion aperture 16*b* to the blade edge 16*a*. Fitting engaging concave portions $16d_1$, $16d_2$ are formed at both side portions of the blade body 16 displaced slightly toward a rear end thereof from a center thereof. The tape guide groove 16*c* is not always necessary.

At the fitting engaging concave portions $16d_1$, $16d_2$, the blade body 16 is engaged with and fitted to the above-mentioned holding frame portion 15*a* of the pressing member 15.

An operation of the thus arranged binding machine 1 for binding the papers and so on will hereinafter be explained.

Before the binding operation, several preparatory operations must be done. The tape case C is loaded into the tape housing portion 14 through its rear surface opening 14*c*. Then, the binding tape 6 housed in the tape case C in the form of the wound roll is drawn through a slit opening c located at a lower end of a case front surface and brought through the front surface opening 14*f* of the tape housing portion 14 to a portion below the guide portion 13 which is opened by rotating the tape guiding body 26 downward. When the binding tape 6 is to be drawn from the tape case C, the bonding tape 7 is located on the auxiliary tape 8.

The binding tape 6 drawn toward the portion below the guide portion 13 is drawn so as to be located under the front and rear guide pins 33, 34 and the front and rear pressing pieces 35*a*, 35*b*. When, in this state, the tape guiding body 26 is closed, engaged with the housing 11 and stopped by the engaging stopper 32, the binding tape 6 is located along the tape guide surface 26*a* of the tape guiding body 26 and brought in contact with circumferential surface of the ridge guide portion 27 by being gripped by the front and rear guide pins 33, 34 located at the front and rear sides of the ridge guide portions 27, with being pressed at both side edges of the auxiliary tape 8, i.e., the press edge surface portions 8*a*, 8*b* by the pressing pieces 35*a*, 35*b*.

When the movable gripping body 40 is moved toward a back side of the guide portion 13, i.e., toward the main mechanism housing portion 12 in this state, the forwarding click 44 is slid on the binding tape 6 without being engaged with the tape forwarding apertures 10 of the binding tape 6.

When the movable gripping body 40 is moved to a rear position and then slidably returned forward from the main mechanism housing portion 12 side, the forwarding click 44 is engaged with one of the tape forwarding apertures 10 of the binding tape 6 in the guide groove 29 of the tape guiding body 26 while the movable gripping body 40 is being slid. Therefore, the binding tape 6 is drawn by an amount of one interval between the adjacent tape forwarding apertures 10 with the movable gripping body 40 being slid forward.

While being drawn and moved, the binding tape 6 is sharply folded at the ridge guide portion 27 of the tape guiding body 26, i.e., folded and substantially turned up along a curved surface top portion 27*a* of the ridge guide portion 27 with the auxiliary tape 8 being pressed at its both side press edge surface portions 8*a*, 8*b* by the pressing pieces 35*a*, 35*b*. Therefore, since the bonding tape 7 is bonded to the auxiliary tape 8 with being divided into portions each having a predetermined length, the bonding tape 7 is peeled from the auxiliary tape 8 on its front end side at the curved portion formed by the ridge guide portion 27 and moved with being raised as the auxiliary tape 8 is folded and moved. Then, the bonding tape 7 is upward projected from the opening 24 formed between the positioning portion 20 and the press contact surface portion 23 of the guide portion 13 and then located in front of the positioning portion 20. At this time, the bonding tape 7 is held with its front end being temporarily bonded to the contact piece 12*e* (see FIGS. 1 and 9) and its rear end portion being bonded to the auxiliary tape 8. In this state, the tape forwarding aperture 10 of the auxiliary tape 8 is engaged with the reversing feed blocking click 28 of the tape guiding body 26.

As described above, the preparatory operations for the binding operation are completed. Then, when the papers P and so on are bound by the binding machine 1, the papers P and so on are held by inserting its bind side surface p between both of the gripping boards 41, 42 of the movable gripping body 40 returned to the front position of the guide portion 13 and by holding the papers P with the pressing springy boards 42*a*, 42*b* of the upper side gripping board 42 (in a state shown by a two-dot chain line shown in FIG. 1).

When, in this state, the movable gripping body 40 is slidably moved backward, i.e., toward the main mechanism housing portion 12 and forced so that the guide opening groove 41*a* of the lower side gripping board 41 should correspond to the press contact surface portion 23, the bind side surface p of the papers P and so on is gripped between the press contact surface portion 23 and the rotating pressing body 22 and then inserted into the lower portion of the main mechanism housing portion 12. At this time, the bonding tape 7 held in the above raised state is bonded to the end surface $p_1$ on the bind side surface p and then brought onto the positioning portion 20. The bonding tape 7 is folded and positioned at a portion slightly extended downward from the opening 24 with its front half portion being located between the bind side surface p and a sidewise U letter-shaped surface formed of a portion from the mount surface 20*a* and the projected contact surface 20*b* of the positioning portion 20 to the lower surface of the pressing piece 17*b* of the pressing body 17 and with its rear half portion being bonded to the auxiliary tape 8. When the bonding tape 7 is peeled from the auxiliary tape 8, the auxiliary tape 8 is pulled by the bonding tape 7 but engaged with and held by the reversing feed blocking click 28 because the tape forwarding aperture 10 is engaged with the reversing feed blocking click 28, so that the bonding tape 7 is smoothly peeled.

When the pressing member 15 is pushed down by pressing the pressing handle 15*b* against a restoring spring force of the first restoring spring member 19*a* in this state, the pressing body 17 is pressed and lowered through the pressing spring member 18 with being in contact with a front end portion side of the front half portion of the bonding tape 7. The pressing body 17 is pressed onto the bind side surface p of the papers P and then presses the bind side surface p together with the mount surface 20*a* of the positioning portion 20. Therefore, the bonding tape 7 is tightly bonded at its front half portion side to the portion from an upper surface side of the bind side surface p through the end surface $p_1$ thereof to a lower surface side thereof (see FIG. 10).

When the pressing member 15 is further pressed, the pressing member 15 is moved downward with contracting the second restoring spring member 19*b* as described above and the blade body 16 is lowered through the insertion opening 12*b*. The blade edge 16*a* of the blade body 16 reaches the bind side surface p of the papers P and is stuck by the pressing pressure of the pressing member 15 into the bind side surface p. The blade body 16 bores a slit-shaped aperture h having the same size as a lateral cross section of the blade body 16 through the bind side surface p and inserted through the opening 24 to a portion below the guide portion 13. At a position where the blade body 16 is inserted, the rear half portion of the bonding tape 7 is positioned with its rear end being bonded to the auxiliary tape 8 as described above. When the blade body 16 is inserted, the rear half portion of the bonding tape 7 is slidably brought in contact with the blade body 16 and then peeled from the auxiliary tape 8, and at the same time the rear half portion thereof is inserted into the tape insertion aperture 16*b* of the blade body 16 by a restitution force of the rear half portion thereof caused by its being peeled off (see FIG. 11). While the blade body 16 is boring the aperture, the pressing body 17 is kept pressing the bind side surface p of the papers P by the contracted pressing spring member 18.

When the pressing member 15 is stopped from being pressed in this state, the pressing member 15 is strongly slidably returned upward by the double restoring spring force obtained from the first and second restoring spring members 19*a*, 19*b* and at the same time the blade body 16 is also promptly lifted up together with the pressing member 15, so that the blade body 16 can be reliably drawn through the opening 24 from the aperture h bored through the bind side surface p of the papers P. At this time, the rear end portion of the bonding tape 7 inserted into the tape insertion aperture 16*b* of the blade body 16 is brought upward through the aperture h of the bind side surface p from its lower surface side to its upper surface side with following the blade body 16 which is being lifted (see FIG. 12). While the blade body 16 is being pulled out, the rear end portion of the bonding tape 7 is kept inserted into the tape guide groove 16*c* between the blade edge 16*a* of the blade body 16 and the tape insertion aperture 16*b* thereof and hence accommodated therein so as not to be projected in a direction of the thickness of the blade body 16. The pressing body 17 is kept pressing the bind side surface p because being pressed by the spring force of the pressing spring member 18. Therefore, the rear end portion of the bonding tape 7 can be smoothly drawn from the aperture h having the same size as the lateral cross section of the blade body 16.

When the pressing member 15 is completely slid and returned, the pressing body 17 is lifted up and the pressing piece 17*b* leaves the bind side surface p of the papers P.

When the movable gripping body 40 is slidably drawn forward from the lower side of the main mechanism housing portion 12 in this state, the bind side surface p of the papers P is passed between the rotating pressing body 22 and the press contact surface portion 23 with following the sliding movable gripping body 40. When the bind side surface p is passed therebetween, the rear end portion of the bonding tape 7 drawn on the upper surface side of the bind side surface p is folded by the rotating pressing body 22 toward the upper surface side of the bind side surface p and the bonding tape 7 is bonded to the bind side surface p so as to have a shape of a substantially reversed C letter. Then, the rear end portion of the bonding tape 7 is gripped and pressed together with the bind side surface p by the rotating pressing body 22, which is pressed by the spring member 22*c*, and the press contact portion 23, so that the whole surface of the bonding tape 7 is tightly bonded to the bind side surface p (see FIG. 13).

In this state, the movable gripping body 40 is slid and drawn to the front end portion of the guide portion 13 to detach the papers P bound by the bonding tape 7. The papers P are bound by the bonding tape 7 in a state shown by an arrow a in FIG. 3.

When the movable gripping body 40 is slid and drawn, the forwarding click 44 provided in the movable gripping body 40 is engaged with the tape forwarding aperture 10 of the binding tape 6 to forward the auxiliary tape 8 from which the bonding tape 7 is peeled. When the movable gripping body 40 is moved to the front end portion of the guide portion 13, as described above, the movable gripping body 40 is automatically moved because the guide piece 46 is pressed by the stopper cam 47 in the forward direction. The movement of the movable gripping body 40 permits the binding tape 6 to be forwarded by a length of the next one unit. When the binding tape 6 is forwarded, i.e., the auxiliary tape 8 is moved, in order to prepare the next binding operation, the next bonding tape 7 is held with being peeled from the auxiliary tape 8 and raised similarly to the above-mentioned preparatory operations.

The papers P and so on are bound by the bonding tape 7 as described above, so that the auxiliary tape 8 is successively forwarded and ejected from the front end surface side of the tape guiding body 26. The ejected auxiliary tape 8 can be cut and removed by engaging its tape forwarding aperture 10 with the cutting projection 30 projectingly provided on the front end surface of the tape guiding body 26 to pull out the auxiliary tape 8.

For example, the bonding tape 7 has a length obtained by adding the length twice the length from the end surface $p_1$ of the papers P to the aperture h to the length twice the thickness of the papers P to be bound, i.e., the length of the bonding tape 7 is set to a length sufficient to substantially surround the portion between the end surface $p_1$ of the papers P and the aperture h, while difference in thickness of the papers P to be bound can be solved by setting the length of the bonding tape 7 a little longer. In other words, when the papers P to be bound are thin, the end portions of the bonding tape 7 are bounded with being overlapped each other, while when the papers P to be bound are comparatively thick, the head end of the bonding tape 7 and the tale end thereof are bonded with a short interval therebetween and without being overlapped each other.

The bonding tape 7 is inserted and bonded in the above embodiment in the following processes. One end of the bonding tape 7 is bonded to the upper surface of the end portion of the papers P to be bound and the bonding tape 7 is perpendicularly folded and then bonded to the end surface $p_1$ of the papers P. The bonding tape 7 is further perpendicularly folded and bonded to the lower surface of the papers P. Subsequently, the bonding tape 7 is inserted through the tape threading aperture h bored by the blade body 16 and bonded to an end surface, where the aperture is provided, of the papers P. When the papers P are drawn, the bonding tape 7 is further perpendicularly folded to bond the other end thereof to the upper surface around the aperture h of the papers P. Therefore, as shown by the arrow a in FIG.

3, the bonding tape 7 is folded in a tube fashion and bonded to the papers P so as to surround a part of the papers P, and the bound bonding tape 7 has a cross section having a shape of the C letter counterclockwise turned at an angle of 90°. However, the bonding tape 7 bonded to the papers P does not always have a bind shape of the C letter clockwise turned at an angle of 90° and may have shapes of U letter counterclockwise or clockwise turned at an angle of 90° as shown by arrows b and c in FIG. 3, respectively. The tape threading apertures h can be bored by the blade body 16 at two optional positions which are not limited to the end portion of the papers P as shown by an arrow d in FIG. 3, thereby bonding the bonding tape 7 in a substantial shape of the C letter turned counterclockwise at an angle of 90°.

Two methods of threading the bored aperture h with the bonding tape 7 can be considered: the former, as shown in FIG. 1, is that, as described in the above embodiment, the bonding tape 7 is inserted into the tape insertion aperture 16*b* provided through the center of the blade body 16 after the blade body 16 bores the aperture h through the papers P and when the blade body 16 is pulled out, the blade body 16 is drawn together with the bonding tape 7 to thread the tape insertion aperture 16*b* with the bonding tape 7; and the latter is that the bonding tape 7 is previously inserted into the tape insertion aperture 16*b* provided through the center of the blade body 16 before the boring operation and the blade body 16 bores the aperture h through the papers P with the bonding tape 7 being inserted thereinto to thread the aperture h with the bonding tape 7. The method of threading the tape insertion aperture 16*b* with the bonding tape 7 is not limited to these methods.

This embodiment, as shown in FIG. 8, adopts the blade body 16 having the blade edge 16*a* which is reversed mountain-shaped and curved upward at its center. The shape of the blade body 16 is not limited to the above shape. When the papers are thick, it is desirable that an ordinary blade is formed in the form of a single blade edge which is mountain-shaped and sharply curved downward at its center. The number of the blade body is not limited to one, but the blade having a plurality of blade edges can be adopted. It can be freely selected whether the blade edge 16*a* is single-blade-edged or double-blade-edged and which direction the blade edge is directed in. In consideration of a method in which a machine such as a puncher or the like bores a circular aperture through a corner of the papers, this embodiment can adopt a method in which a small aperture with a predetermined width used for passing the bonding tape 7 therethrough is bored through the end portion of the papers P by using a box-shaped boring blade for boring a rectangular aperture or a circular shaped boring blade. In this case, it may be facilitated to pass the bonding tape 7 through the bored aperture h. While the arranged blade portion lifts the bonding tape to the upper surface of the papers P to pass the bonding tape 7 through the bored aperture in this embodiment, if a wider aperture is formed, then the bonding tape 7 can be passed through the bored aperture h with ease, so that it is unnecessary to pass the bonding tape 7 through the bored aperture h as described in the embodiment.

While the blade body 16 bores the aperture h through the papers P in a vertical direction downward from a portion above the papers P in this embodiment, the blade body 16 can bore the aperture h in a vertical direction upward from a portion below the papers P. While in this embodiment the bonding tape 7 is inserted into the tape insertion aperture 16*b* provided through the center of the blade body 16 after the aperture h is bored through the papers P, the bonding tape 7 can be previously inserted into the tape insertion aperture 16*b* before the blade body 16 bores the aperture h through the papers P.

In this embodiment, only the first restoring spring member 19*a* may be employed as the restoring springy body for slidably returning the pressing member 15, and there can be employed a spring member in which the first and second restoring spring members 19*a*, 19*b* are integrally formed, i.e., integrally continuously formed so that a spring force at its lower portion should be strong.

The binding machine using the tape according to the present invention enjoys the following effects because it has an arrangement described in detail above and does not use a metal staple.

(1) Since the papers are bound with the binding tape, the bind portion becomes considerably thin and is prevented from becoming thick as compared with a bind portion bound by the conventional stapling machine.

(2) Since the binding tape as a binding material can be formed of a cellophane, a cloth, a synthetic paper or synthetic resin such as propylene, vinyl chloride or the like, even if the binding tape is fed into a paper cutter, the whole of the papers including the bind portion can be cut and problems such as trouble of the paper cutter or the like are prevented from being caused. A peeling instrument such as a remover or the like for the binding tape becomes unnecessary. Further, a fingernail is prevented form being injured when the bonding tape is peeled with a fingernail.

(3) Since a material of the binding tape is a material such as a paper or the like as described above, the binding tape is never rusted. Therefore, the papers necessary to be kept for a long period of time are prevented from suffering from rust, and use of a paper string and a string is not required.

(4) Since the binding tape is made of a paper and so on, there is no risk such that the staple is stuck in the finger by mistake when the papers are bound. There is no risk such that a metal piece catches a cloth and injures a skin because it is not satisfactorily bent but projectingly kept.

(5) Since the sharp blade body bores the aperture through the papers, the aperture can be bored without failure.

(6) Even when use of a letter opener is expected, a blade portion of the opener is prevented from being damaged because the letter is bound with a paper tape.

(7) Even when the binding tape is used to wrap a material such food, medicine to be handed to a sick person or the like, the binding tape can be safely used because a metal piece is prevented from remaining in the food, the medicine and so on.

(8) Since the binding tape to serve as the bind material is made of a material such as paper, cloth, synthetic resin or the like, it can be supplied with extremely inexpensive price and hence use of the binding tape becomes economical.

(9) Since the binding tape is made of a material such as paper, synthetic paper, synthetic resin or the like, there is then the advantage such that the binding tape can be used for advertisement and so on because advertisement, instructions and so on can be written or drawn even on the bonding tape which serves as the binding material.

(10) Since the binding machine can be formed as a handy type binding machine in addition to a desktop type binding machine, the binding machine of this type can be convenient in portability and the inexpensive binding machine using the tape can be provided.

The binding machine using the tape and the binding tape according to the present invention enjoys many advantages and effects as described above. According to the present invention, the binding machine and a refill for the binding tape serving as the bind material can be provided with inexpensive prices as compared with that of the conventional stapling machine. Therefore, the binding machine using the tape and the binding tape according to the present invention is economical and excellent in practical use.

Having described the preferred embodiments of the present invention with reference to the accompanying drawings, it is to be understood that the present invention is not limited to these embodiments and that various kinds of changes and modifications in shape of the members, arrangement and so on can be effected by one skilled in the art without departing from the spirit or scope of the present invention as defined in the appended claims.

What is claimed is:

1. A tape system for use in the non-metal binding of paper and the like, comprising an endless bonding tape coated on its rear surface with an adhesive, said bonding tape being cut transversely along its length at predetermined intervals, so that each bonding tape has a predetermined length; an auxiliary tape on which said bonding tape is releasably held, said auxiliary tape being wider than said bonding tape to provide marginal portions where no bonding tape is formed; and tape forwarding apertures bored through said auxiliary tape and said bonding tape, each of said tape forwarding aperture being positioned at each of said cut intervals between adjacent bonding tapes, respectively.

2. The binding tape according to claim 1, wherein said bonding tape is selected from the group consisting of a transparent cellophane tape, a cloth tape or a resin tape coated on its rear surface with an adhesive.

3. The binding tape according to claim 1, wherein said bonding tape is made of a paper tape coated on its rear surface with an adhesive.

4. The binding tape according to claim 1, wherein a tape forwarding notch portion is provided at at least one side, said auxiliary tape being in alignment with the cut intervals.

* * * * *